United States Patent [19]

Stoldt et al.

[11] Patent Number: 5,730,029
[45] Date of Patent: Mar. 24, 1998

[54] ESTERS DERIVED FROM VEGETABLE OILS USED AS ADDITIVES FOR FUELS

[75] Inventors: Stephen H. Stoldt, Concord Township; Harshida Dave, Highland Heights, both of Ohio

[73] Assignee: The Lubrizol Corporation, Wickliffe, Ohio

[21] Appl. No.: 811,746

[22] Filed: Feb. 26, 1997

[51] Int. Cl.⁶ .......................................... C10L 1/18
[52] U.S. Cl. .................................................. 44/389
[58] Field of Search ........................... 44/389, 388, 398, 44/403

[56] References Cited

U.S. PATENT DOCUMENTS

| | | | |
|---|---|---|---|
| 1,692,784 | 11/1928 | Orelup et al. | |
| 2,210,140 | 8/1940 | Colbeth | 252/56 |
| 3,713,792 | 1/1973 | Wiley | 44/389 |
| 4,031,019 | 6/1977 | Bell | 252/56 |
| 4,364,743 | 12/1982 | Erner | 44/388 |
| 4,627,192 | 12/1986 | Fick | 47/58 |
| 4,668,439 | 5/1987 | Billenstein et al. | 560/231 |
| 4,695,411 | 9/1987 | Stern et al. | 44/388 |
| 4,743,402 | 5/1988 | Fick | 260/412.2 |
| 4,920,691 | 5/1990 | Fainman | 44/57 |
| 5,338,471 | 8/1994 | Lal | 252/56 S |
| 5,522,906 | 6/1996 | Hashimoto et al. | 44/400 |
| 5,525,126 | 6/1996 | Basu et al. | 44/308 |

*Primary Examiner*—Margaret Medley
*Attorney, Agent, or Firm*—James L. Cordek; Frederick D. Hunter; Joseph P. Fischer

[57] ABSTRACT

A fuel composition is disclosed which comprises
(A) at least one low sulfur diesel fuel; and
(B) esters from the transesterification of at least one animal fat or vegetable oil triglyceride of the formula

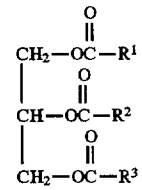

wherein $R^1$, $R^2$ and $R^3$ are aliphatic hydrocarbyl groups having at least 60 percent monounsaturated character and containing from about 6 to about 24 carbon atoms with an alcohol or phenol $R^4OH$ wherein $R^4$ is an aliphatic group containing from 1 to about 22 carbon atoms or an aromatic or substituted aromatic group containing from 6 to about 50 carbon atoms.

17 Claims, No Drawings

ESTERS DERIVED FROM VEGETABLE OILS USED AS ADDITIVES FOR FUELS

FIELD OF THE INVENTION

The present invention relates to esters derived from animal fat or vegetable oils as additives for low sulfur diesel fuels. These esters improve the lubricity of the diesel fuel in addition to acting as a combustion chamber deposit improver.

BACKGROUND OF THE INVENTION

Although the lubrication requirements of diesel engines are basically the same as those of spark ignition engines, diesel engines normally impose more severe demands upon the lubricating oil due largely to the type of fuel used. Since diesel fuels are relatively heavy and non-volatile compared to gasolines, complete and clean combustion is difficult to attain, and products of incomplete combustion tend to complicate engine lubrication requirements.

In gasoline engines, the volatile fuel is largely vaporized in the intake manifold, so that the air-fuel mixture reaching the combustion chambers contain the gasoline in the form of vapor and/or finely dispersed "fog". In spite of these favorable conditions for clean and complete burning, gasoline engines suffer from poor combustion under many conditions of operation, giving rise to formation of soots and resins which may then work past pistons to contaminate the crankcase oil and ultimately to form sludge and varnish deposits.

In diesel engines imperfect combustion also leads to formation of soots and resins, and because of the more complex hydrocarbon structure of diesel fuels, such soot and resin formation may readily occur to a considerably greater extent than is the case with gasolines in spark ignition engines. These greater tendencies toward soot and resin formation account largely for the more severe demands imposed by diesel engines upon the lubricating oil. In general, diesel engines tend to have greater ring-sticking and piston-varnishing tendencies from the accumulation and baking of fuel soots and resins on these hot surfaces. The crankcase oil also tends to become more rapidly and heavily contaminated with soots and resins, and this in severe instances leads to buildup of heavy sludge deposits on oil filters and on engine surfaces.

U.S. Pat. No. 1,692,784 (Orelup et al., Nov. 20, 1928) relates to fuels for internal combustion engines and to ingredients for treating such fuels. This reference is chiefly concerned with a liquid fuel which has the property of eliminating "carbon" from the cylinders of an engine, and preventing the formation of such "carbon".

A composition or ingredient is provided which is adapted to be added directly to liquid fuel of ordinary characteristics, such for instance as gasoline, thereby producing a blended or treated fuel which has the property of preventing or reducing the formation of carbon in the engine in which it is used, and which also tends to wholly or partly eliminate carbon which may already be present in the engine.

U.S. Pat. No. 2,210,410 (Colbeth, Aug. 6, 1940) relates to a lubricant that is produced by mixing an ester with an organic product which may be either a liquid or a solid and has lubricating properties.

By the present reference a lubricant is produced which surpasses mineral oil lubricants for lubricating purposes. Also, the presence of vegetable oils or fatty material which would undergo decomposition and give rise to troubles such as formation of gum and producing stickiness, are obviated.

In carrying out this reference esters of aliphatic acids are formed and these esters are mixed or compounded with an organic product of lubricating character with which the esters will form a solution. The aliphatic acids that are esterified for this purpose should contain at least eleven carbon atoms and are found in large quantities in vegetable oils. Some of the aliphatic acids which may be mentioned as suitable for this purpose are: oleic acid, stearic acid, ricinoleic acid, linolic acid and others which are commonly found in vegetable oils. The esters may be either methyl, ethyl, propyl, isopropyl, butyl, isobutyl, amyl, isoamyl, glycol, diethylene glycol, and higher glycols, etc. The alcohols that are used for producing the esters to be used in this invention should not have more than two hydroxyl groups, or the residue thereof should have a valency less than 3.

U.S. Pat. No. 4,031,019 (Bell, Jun. 21, 1977) relates to compounds prepared by direct esterification of fatty acids and certain alcohols or by transesterification of vegetable oils with alcohols. It further relates to compounds prepared by sulfurization of the alcohol esters. The compounds are useful as lubricants in the continuous casting of steel and as extreme pressure lubricant additives.

U.S. Pat. No. 4,695,411 (Stern et al., Sep. 22, 1987) concerns a new process for manufacturing a fatty acid ester composition comprising a major portion of ethyl esters useful as gas oil substitute motor fuel, the raw materials consisting of oil or a grease of vegetable or animal origin and of one or more alcohols, mainly hydrated ethyl alcohol. It also concerns the ester compositions obtained by said process.

These esters are destined for use as a substitute of gas oil and must be of high purity, generally at least 97% esters content. On the other hand, after purification, it is desirable that the yield by weight of raw esters, in proportion to the oil and irrespective of the alcohol content in the ester phase, be at least equal to 95% and preferably from 97 to 102%.

Transesterification or alcoholysis of triglycerides or oils of vegetable or animal origin in the presence of an alcohol or acid or basic catalyst advantageously leads to the formation of fatty acid esters of alcohol and glycerol.

U.S. Pat. No. 4,920,691 (Fainman, May 1, 1990) relates to additives for liquid fuels, and more particularly, to an additive for diesel fuel which improves the performance, fuel efficiency and control of emissions of a vehicle using the fuel.

Examples of high molecular weight carboxylic acids or esters thereof which may be used as the additive of this reference are oleic acid, stearic acid, palmitic acid, pelargonic acid, hexanoic acid, dodecyl pelargonate, sorbitan monoleate, isopropyl palmitate and butyl stearate.

U.S. Pat. No. 5,338,471 (Lal, Aug. 16, 1994) relates to vegetable oils that possess at least 60 percent monounsaturation content, vegetable oils that are transesterified and contain at least one pour point depressant. In addition to pour point depressants, the vegetable oil and transesterified product also contains a performance additive designed to enhance the performance of the vegetable oil and transesterified product when used in hydraulic fluids, two-cycle (two stroke) internal combustion engines, gear oils, and passenger car motor oils.

U.S. Pat. No. 5,522,906 (Hashimoto et al., Jun. 4, 1996) relates to a gasoline composition comprising:
(a) gasoline,
(b) 1–10,000 ppm of a deposit inhibitor or a detergent containing a basic nitrogen atom, (c) 1–10,000 ppm of a carrier oil, and (d) one or more heat resistance improvers selected from the group consisting of:

(d-1) an ester of a fatty acid and an alkylene oxide addition compound, wherein the compound to which the alkylene oxide is added has the following formula (I):

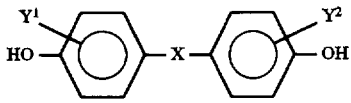

wherein X represents

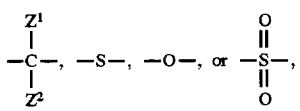

(wherein $Z^1$ and $Z^2$ are individually a hydrogen atom, a trifluoromethyl group, or a substituted or unsubstituted alkyl or alkenyl group having 1–6 carbon atoms, or a phenyl group), and $Y^1$ and $Y^2$ are individually a hydrogen atom or a substituted or unsubstituted alkyl or alkenyl group having 1–6 carbon atoms, or a phenyl group.

(d-2) a compound obtained by the ester exchange reaction of an alcohol and a triglyceride-type fat or oil alkylene oxide adduct thereof, (d-3) an aliphatic or aromatic carboxylic acid having 12–30 carbon atoms, (d-4) a metal salt of an aliphatic or aromatic carboxylic acid having 4–30 carbon atoms, (d-5) an ester of an aliphatic or aromatic carboxylic acid having 12–30 carbon atoms and an alcohol having 1–8 carbon atoms, and (d-6) an ester of boric acid.

U.S. Pat. No. 5,525,126 (Basu et al., Jun. 11, 1996) includes a process for producing esters from a feedstock that includes a fat or an oil. The process includes mixing the feedstock with an alcohol and a catalyst to form a reaction mixture. The catalyst includes a mixture of calcium acetate and barium acetate. The reaction mixture is heated to a temperature effective for making esters. This process is unique with respect to a conversion of high free fatty acid oil to oil with less than 10% free fatty acids by weight in a single step.

SUMMARY OF THE INVENTION

A fuel composition is disclosed which comprises (A) at least one low sulfur diesel fuel; and (B) esters from the transesterification of at least one animal fat or vegetable oil triglyceride of the formula

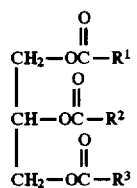

wherein $R^1$, $R^2$ and $R^3$ are aliphatic hydrocarbyl groups having at least 60 percent monounsaturated character and containing from about 6 to about 24 carbon atoms with an alcohol or phenol $R^4OH$ wherein $R^4$ is an aliphatic group containing from 1 to about 22 carbon atoms or an aromatic or substituted aromatic group containing from 6 to about 50 carbon atoms.

DETAILED DESCRIPTION OF THE INVENTION (A) The Low Sulfur Diesel Fuel

The diesel fuels that are useful with this invention can be any diesel fuel having a sulfur content of no more than about 0.5% by weight, and preferably no more than about 0.05% by weight as determined by the test method specified in ASTM D 2622-87 entitled "Standard Test Method for Sulfur in Petroleum Products by X-Ray Spectrometry." Any fuel having the indicated sulfur content and a boiling range and viscosity suitable for use in a diesel-type engine can be used. These fuels typically have a 90% Point distillation temperature in the range of about 300° C. to about 390° C., preferably about 330° C. to about 350° C. The viscosity for these fuels typically range from about 1.3 to about 24 centistokes at 40° C. These diesel fuels can be classified as any of Grade Nos. 1-D, 2-D or 4D as specified in ASTM D 975 entitled "Standard Specification for Diesel Fuel Oils." These diesel fuels can also contain alcohols.

(B) The Transesterified Esters

The transesterified ester is formed by reacting a natural oil comprising animal fat or vegetable oils with an alcohol. These natural oils are triglycerides of the formula

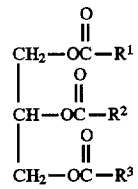

wherein $R^1$, $R^2$ and $R^3$ are aliphatic hydrocarbyl groups having at least 60 percent monounsaturated character and containing from about 6 to about 24 carbon atoms. The term "hydrocarbyl group" as used herein denotes a radical having a carbon atom directly attached to the remainder of the molecule. The aliphatic hydrocarbyl groups include the following:

(1) Aliphatic hydrocarbon groups; that is, alkyl groups such as heptyl, nonyl, undecyl, tridecyl, heptadecyl; alkenyl groups containing a single double bond such as heptenyl, nonenyl, undecenyl, tridecenyl, heptadecenyl, heneicosenyl; alkenyl groups containing 2 or 3 double bonds such as 8,11-heptadecadienyl and 8,11,14-heptadecatrienyl. All isomers of these are included, but straight chain groups are preferred.

(2) Substituted aliphatic hydrocarbon groups; that is groups containing non-hydrocarbon substituents which, in the context of this invention, do not alter the predominantly hydrocarbon character of the group. Those skilled in the art will be aware of suitable substituents; examples are hydroxy, carbalkoxy, (especially lower carbalkoxy) and alkoxy (especially lower alkoxy), the term, "lower" denoting groups containing not more than 7 carbon atoms.

(3) Hetero groups; that is, groups which, while having predominantly aliphatic hydrocarbon character within the context of this invention, contain atoms other than carbon present in a chain or ring otherwise composed of aliphatic carbon atoms. Suitable hetero atoms will be apparent to those skilled in the art and include, for example, oxygen, nitrogen and sulfur.

Preferably the naturally occurring triglycerides are vegetable oil triglycerides.

The fatty acid moieties are such that the triglyceride has a monounsaturated character of at least 60 percent, preferably at least 70 percent and most preferably at least 80 percent. Normal sunflower oil has an oleic acid content of 25–30 percent. By genetically modifying the seeds of sunflowers, a sunflower oil can be obtained wherein the oleic content is from about 60 percent up to about 90 percent. That is, the $R^1$, $R^2$ and $R^3$ groups are heptadecenyl groups and the $R^1COO^-$, $R^2COO^-$ and $R^3COO^-$ to the 1,2,3-propanetriyl group —$CH_2CHCH_2$— are the residue of an oleic acid molecule. U.S. Pat. Nos. 4,627,192 and 4,743,402 are herein incorporated by reference for their disclosure to the preparation of high oleic sunflower oil.

For example, a triglyceride comprised exclusively of an oleic acid moiety has an oleic acid content of 100% and consequently a monounsaturated content of 100%. Where the triglyceride is made up of acid moieties that are 70% oleic acid, 10% stearic acid, 5% palmitic acid, 7% linoleic and 8% hexadecenoic acid, the monounsaturated content is 78%. It is also preferred that the monounsaturated character be derived from an oleyl radical, i.e.,

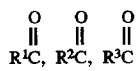

is the residue of oleic acid. The preferred triglyceride oils are high oleic, that is, genetically modified (at least 60 percent) acid residue triglyceride oils. Typical genetically modified vegetable oils employed within the instant invention are genetically modified safflower oil, genetically modified corn oil, genetically modified rapeseed oil, genetically modified sunflower oil, genetically modified soybean oil, genetically modified cottonseed oil and genetically modified palm olein. A preferred genetically modified vegetable oil is genetically modified sunflower oil obtained from Helianthus sp. This product is available from AC Humko, Memphis, Tenn. as Sunyl® high genetically modified sunflower oil. Sunyl 80 is a genetically modified triglyceride wherein the acid moieties comprise 80 percent oleic acid. Another preferred genetically modified vegetable oil is genetically modified rapeseed oil obtained from Brassica campestris or Brassica napus, also available from AC Humko as RS genetically modified rapeseed oil. RS80 signified a rapeseed oil wherein the acid moieties comprise 80 percent oleic acid.

It is to be noted that olive oil is excluded as a vegetable oil in this invention. The oleic content of olive oil typically ranges from 65–85 percent. This content, however, is not achieved through genetic modification, but rather is naturally occurring.

It is further to be noted that genetically modified vegetable oils have high oleic acid content at the expense of the di- and tri-unsaturated acids. The di- and tri-unsaturation can best be labeled as polyunsaturated character and the polyunsaturated character of component (B) is not more than 15 percent by weight, preferably 10 percent by weight and most preferably 5 percent by weight. As discussed above, the monounsaturated character is due to an oleic acid residue and therefore the diunsaturation character is due to a linoleic acid residue and the triunsaturation character is due to a linolenic acid residue.

Alcohols utilized in forming the transesterified esters are of the formula $R^4OH$ wherein $R^4$ is an aliphatic group that contains from 1 to about 24 carbon atoms. The $R^4$ may be straight chained or branched chain, saturated or unsaturated. An illustrative but nonexhaustive list of alcohols are: methyl alcohol, ethyl alcohol, n-propyl alcohol, isopropyl alcohol and the isomeric butyl, pentyl, hexyl, heptyl, octyl, nonyl dodecyl, pentadecyl and octadecyl alcohols. Preferably the alcohol is methyl alcohol. The $R^4$ may also be an aromatic or substituted aromatic group containing from 6 up to about 50 carbon atoms. When $R^4$ is aromatic, it is preferably a phenyl group.

The transesterification occurs by mixing at least 3 moles of $R^4OH$ per 1 mole of triglyceride. A catalyst, when employed, comprises alkali or alkaline earth metal alkoxides containing from 1 up to 6 carbon atoms, alkali or alkaline earth metal carbonates, alkali or alkaline earth metal titanates wherein the alkyl group contains from 1 to 6 carbon atoms. Preferred catalysts are sodium or potassium methoxide, calcium or magnesium methoxide, the ethoxides of sodium, potassium, calcium or magnesium and the isomeric propoxides of sodium, potassium, calcium or magnesium. A preferred alkyl titanate is tetra isopropyl titanate. The most preferred catalyst is sodium methoxide.

The transesterification occurs at a temperature of from ambient up to the decomposition temperature of any reactant or product. Usually the upper temperature limit is not more than 150° C. and preferably not more than 120° C. In the transesterification mixed esters are obtained according to the following reaction:

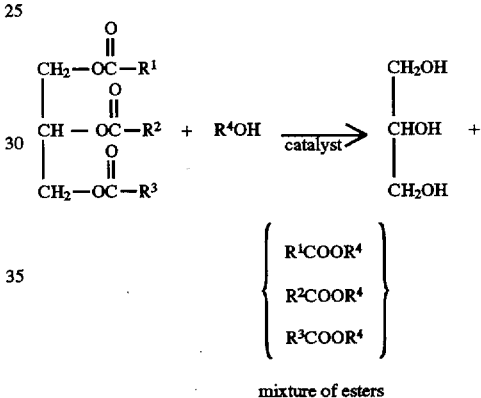

mixture of esters

Transesterification is an equilibrium reaction. To shift the equilibrium to the right it is necessary to use either a large excess of alcohol, or else remove glycerol as it is formed. When using an excess of alcohol, once the transesterification reaction is complete the excess alcohol is removed by distillation.

The following examples are illustrative of the preparation of the transesterified product of the present invention. Unless otherwise indicated, all parts and percentages are by weight.

EXAMPLE B-1

Charged to a 12 liter 4 neck flask is 7056 parts (8 moles) genetically modified (80%) rapeseed oil, 1280 parts (40 moles) absolute methyl alcohol and 70.5 parts (1.30 moles) sodium methoxide. The contents are heated to a reflux temperature of 73° C. and held at this temperature for 3 hours and 76 parts (0.65 moles) of 85% phosphoric acid is added dropwise in 0.4 hours to neutralize the catalyst. Excess methyl alcohol is then removed by heating to 100° C. with nitrogen blowing at 0.2 cubic feet per hour and later to a vacuum of 30 millimeters of mercury. The contents are filtered to give 6952 parts of the transesterified methyl ester of genetically modified rapeseed oil.

EXAMPLE B-2

The procedure of Example B-1 is essentially followed except that the genetically modified rapeseed oil is replaced with genetically modified (80%) sunflower oil to give the transesterified methyl ester of high oleic sunflower oil.

EXAMPLE B-3

Charged to a 5 liter 4 neck flask is 759 pans (12.5 moles) isopropyl alcohol. While at room temperature, 5.75 parts (0.25 moles) elemental sodium is slowly added. When all the sodium is reacted, added is 2205 (2.5 moles) genetically modified (80%) sunflower oil. The contents are heated to 85° C. and held for 4 hours followed by neutralization of the catalyst with 9.67 parts (0.083 moles) of 85% phosphoric acid. The contents are stripped to 120° C. at 27 millimeters of mercury to give 2350 parts of the transesterified isopropyl ester of genetically modified sunflower oil.

EXAMPLE B-4

The procedure of Example B-3 is essentially followed except that the catalyst is made by reacting 690 pans (15 moles) absolute ethyl alcohol with 6.9 pans (0.3 moles) sodium metal and then followed by the addition of 2646 parts (3.0 moles) genetically modified (90%) sunflower oil. The catalyst is neutralized with 11.6 pans (0.10 moles) of 85% phosphoric acid. The product obtained is the transesterified ethyl ester of genetically modified sunflower oil.

EXAMPLE B-5

The procedure of Example B-4 is essentially followed except that the catalyst is made by reacting 910 parts (15 moles) n-propyl alcohol with 6.9 parts (0.3 moles) sodium metal. The product obtained is the transesterified n-propyl ester of genetically modified sunflower oil.

EXAMPLE B-6

The procedure of Example B-4 is followed except that the catalyst is made by reacting 1114.5 pans (15 moles) n-butyl alcohol with 6.9 parts (0.3 moles) sodium metal. The product obtained is the transesterified n-butyl ester of genetically modified sunflower oil.

EXAMPLE B-7

The procedure of Example B-3 is essentially followed except that the catalyst is made by reacting 1300 (12.5 moles) n-hexyl alcohol with 5.75 parts (0.25 moles) sodium metal and then followed by the addition of 2205 pans (2.5 moles) genetically modified (80%) sunflower oil. The catalyst is neutralized with 9.7 parts (0.083 moles) of 85% phosphoric acid. The product obtained is the transesterified n-hexyl ester of genetically modified sunflower oil.

The fuel composition of this invention comprises an admixture of components (A) and (B). Generally from 200 to 5,000 parts per million and preferably from 800 to 2,000 parts per million of (B) is present in (A). Order of addition is of no consequence although typically (B) is added to (A). The components (A) and (B) are blended together to effect solution.

Table I is a comparison of a modified ASTM D5001 which is a measurement of lubricity of fuels by the Ball-on-Cylinder Lubricity Evaluator (BOCLE). Parameters for the ASTM test and its modified version are as follows:

|  | BOCLE | Modified BOCLE |
|---|---|---|
| Load | 1 Kg | 7 Kg |
| Humidity | 10% | 50% |
| kPa | 100 | 200 |
| Speed | 240 and 300 RPM | 240 and 300 RPM |
| Condition time | 15 min. | 15 min. |
| Test Time | 30 min. | 2 min. |
| Temperature | 25° C. | 25° C. |

The standard BOCLE Wear Test (ASTM D5001) measures the property of an aviation turbine fuel to inhibit mild wear between rubbing steel components. The principal wear mechanisms involved are oxidation, corrosive and abrasive, however, in fuel lubricated equipment, failures from severe adhesive wear, usually manifested as scuffing, are more significant. Clearly, in order to measure the propensity of a fuel to inhibit scuffing, a test method that is dominated by that mechanism is required. The modified BOCLE accomplishes that purpose.

In the ASTM D5001 BOCLE test with a load of 1 Kg and 10% relative humidity, the mount of adhesion is small and is rapidly obscured by the formation of oxide and fuel derived reaction films. However, by operating at a high fixed load and high relative humidity as in the modified BOCLE, the adhesive wear or scuffing process becomes dominant. Although for most fuels scuffing is inhibited within two minutes from the start of the test, the wear scars so generated are quantitative measure of the property of a fuel to inhibit scuffing. Like D5001, a 15 minute conditioning period is used and also like D5001, control of cleanliness, relative humidity and temperature are critical.

In the modified BOCLE, the performance criteria is the measure of the mean wear scar on the ball. Low sulfur diesel fuels as component (A) are subjected to the BOCLE test. Wear scar data is generated which is the baseline. BOCLE test data is also generated on the same low sulfur diesel fuels as component (A), but with the inclusion of transesterified esters as component (B). In all instances, an improvement is noted when (B) is present.

TABLE I

| Example No. | Component (A)[1] | Component (B) | Wear Scar | % Improvement |
|---|---|---|---|---|
| 1 | Fuel 1[2] | None | 0.822 | — |
| 2 | Fuel 1[2] Fuel[3] | 2000 parts per million of the product of Example B-2 | 0.729 | 11.3 |
| 3 |  | None | 0.700 | — |
| 4 | Fuel[3] | 2000 parts per million of the product of Example B-2 | 0.531 | 24.1 |
| 5 | Fuel 3[4] | None | 0.710 | — |
| 6 | Fuel 3[4] | 2000 parts per million of the product of Example B-2 | 0.589 | 17.0 |

[1]The fuels utilized as component (A) have a sulfur level of not more than 0.05 percent by weight
[2]A commercial fuel available from Exxon Chemical identified as Isopar-M
[3]A commercial fuel available from Arco Chemical Technology
[4]A commercial fuel available from Total While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A fuel composition comprising
(A) at least one low sulfur diesel fuel and
(B) esters from the transesterification of at least one vegetable oil triglyceride of the formula

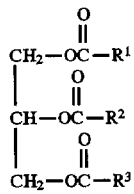

wherein $R^1$, $R^2$ and $R^3$ are aliphatic hydrocarbyl groups having at least 60 percent monounsaturated character and containing from about 6 to about 24 carbon atoms with an alcohol of the formula $R^4OH$ wherein $R^4$ is an aliphatic group containing from 1 and wherein the vegetable oil triglyceride comprises genetically modified sunflower oil, genetically modified safflower oil, genetically modified corn oil, genetically modified cottonseed oil, genetically modified palm oil, genetically modified soybean oil or genetically modified rapeseed oil.

2. The fuel composition of claim 1 wherein the triglyceride has at least 70 percent monounsaturated character.

3. The fuel composition of claim 1 wherein the triglyceride has at least 80 percent monounsaturated character.

4. The fuel composition of claim 1 wherein the monounsaturated character is due to an oleic acid residue.

5. The fuel composition of claim 1 wherein $R^4$ is an aliphatic group that contains from about 1 to about 6 carbon atoms.

6. The fuel composition of claim 1 wherein $R^4$ is a methyl group.

7. The fuel composition of claim 1 wherein the transesterification of (B) is carried out in the presence of a catalyst comprising alkali or alkaline earth metal alkoxides containing from 1 to 6 carbon atoms, alkali or alkaline earth metal carbonates, alkali or alkaline earth metal acetates or alkyl titanates wherein the alkyl group contains from 1 to 6 carbon atoms.

8. The fuel composition of claim 1 wherein the transesterification of (B) is carried at a temperature of ambient up to the decomposition temperatures of any reactant or product.

9. The fuel composition of claim 1 wherein (B) is present in (A) at from 200 to 5000 parts per million.

10. The fuel composition of claim 1 wherein (B) is present in (A) at from 800 to 2000 parts per million.

11. The fuel composition of claim 1 wherein the sulfur level of (A) is not more than 0.5 percent by weight.

12. The fuel composition of claim 1 wherein the alkyl titanate is tetra isopropyl titanate.

13. The fuel composition of claim 1 wherein the (B) has a polyunsaturated character of not more than 15 percent by weight.

14. The fuel composition of claim 1 wherein the (B) has a polyunsaturated character of not more than 10 percent by weight.

15. The fuel composition of claim 1 wherein the (B) has a polyunsaturated character of not more than 5 percent by weight.

16. The fuel composition of claim 13 wherein the polyunsaturated character comprises diunsaturation character and triunsaturation character.

17. The fuel composition of claim 16 wherein the diunsaturation character is due to a linoleic acid residue and the triunsaturation character is due to a linolenic acid residue.

* * * * *

UNITED STATES PATENT AND TRADEMARK OFFICE
CERTIFICATE OF CORRECTION

PATENT NO. : 5,730,029
DATED : Mar. 24, 1998
INVENTOR(S) : Stephen H. Stoldt and Harshida Dave It is certified that error appears in the above-identified patent and that said Letters Patent is hereby corrected as shown below:

In claim 1, line numbered 19 (fifth line following the formula), after the words "containing from 1" insert the words —to about 24 carbon atoms—.

Signed and Sealed this

Thirtieth Day of January, 2001

*Attest:*

Q. TODD DICKINSON

*Attesting Officer*     *Director of Patents and Trademarks*